US012164190B2

(12) United States Patent
Igeta et al.

(10) Patent No.: US 12,164,190 B2
(45) Date of Patent: Dec. 10, 2024

(54) CAMERA MODULE

(71) Applicant: Japan Display Inc., Tokyo (JP)

(72) Inventors: Koichi Igeta, Tokyo (JP); Kasumi Hase, Tokyo (JP); Yoshiro Aoki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/100,008

(22) Filed: Jan. 23, 2023

(65) Prior Publication Data

US 2023/0236454 A1    Jul. 27, 2023

(30) Foreign Application Priority Data

Jan. 26, 2022   (JP) .................................. 2022-010316

(51) Int. Cl.
 *G02F 1/1335*    (2006.01)
 *G02F 1/1333*    (2006.01)
(52) U.S. Cl.
 CPC .............. *G02F 1/133526* (2013.01); *G02F 1/133354* (2021.01); *G02F 1/133565* (2021.01)
(58) Field of Classification Search
 CPC ......... G02F 1/133526; G02F 1/133565; G02F 1/133354; H05B 45/10; H05B 47/155
 See application file for complete search history.

(56) References Cited

U.S. PATENT DOCUMENTS

| 4,380,372 | A | * | 4/1983 | Taguchi | G02F 1/13731 |
| | | | | | 349/169 |
| 5,170,204 | A | * | 12/1992 | Mukai | G03B 17/20 |
| | | | | | 396/296 |
| 2004/0012753 | A1 | * | 1/2004 | Udaka | H04N 23/75 |
| | | | | | 349/187 |
| 2005/0195313 | A1 | * | 9/2005 | Tsuji | G03B 7/095 |
| | | | | | 348/362 |
| 2008/0284931 | A1 | * | 11/2008 | Kimura | G02F 1/13624 |
| | | | | | 349/39 |
| 2016/0026026 | A1 | * | 1/2016 | Kim | G02F 1/1337 |
| | | | | | 349/123 |
| 2016/0041449 | A1 | * | 2/2016 | Clark | G02B 3/12 |
| | | | | | 349/194 |

FOREIGN PATENT DOCUMENTS

| JP | H03-42621 | A | | 2/1991 |
| JP | H0829812 | A | * | 2/1996 |
| JP | 2000089188 | A | * | 3/2000 |
| JP | 2003050398 | A | * | 2/2003 |
| JP | 2005173493 | A | * | 6/2005 |
| JP | 2005338233 | A | * | 12/2005 |
| JP | 4005178 | B2 | * | 11/2007 |
| JP | 6428977 | B1 | | 11/2018 |

* cited by examiner

*Primary Examiner* — Hoan C Nguyen
(74) *Attorney, Agent, or Firm* — Michael Best & Friedrich LLP (57) ABSTRACT

According to one embodiment, a camera module includes a liquid crystal panel, an image sensor and an optical system. The liquid crystal panel is configured to display a coded aperture pattern. The optical system is interposed between the liquid crystal panel and the image sensor. The liquid crystal panel includes a liquid crystal layer containing liquid crystal molecules and dichroic dye molecules aligned following the liquid crystal molecules.

6 Claims, 9 Drawing Sheets

CAMERA MODULE

CROSS-REFERENCE TO RELATED APPLICATIONS

This application is based upon and claims the benefit of priority from Japanese Patent Application No. 2022-010316, filed Jan. 26, 2022, the entire contents of which are incorporated herein by reference.

FIELD

Embodiments described herein relate generally to a camera module.

BACKGROUND

In recent years, a camera module including a liquid crystal panel, an image sensor disposed on a back surface of the liquid crystal panel, and an optical system interposed between the liquid crystal panel and the image sensor has been developed.

In such a camera module, there is known an encoding aperture technology for, by using blur occurring in an image generated on the basis of light incident on the image sensor, calculating a distance from the camera module to a subject in the image.

However, since such a camera module functions as a normal camera except when the distance to the subject is calculated, the transmittance of the liquid crystal panel is desirably high from the viewpoint of an amount of light that can be incident on the image sensor.

DETAILED DESCRIPTION

In general, according to one embodiment, a camera module includes a liquid crystal panel, an image sensor and an optical system. The liquid crystal panel is configured to display a coded aperture pattern. The optical system is interposed between the liquid crystal panel and the image sensor. The liquid crystal panel includes a liquid crystal layer containing liquid crystal molecules and dichroic dye molecules aligned following the liquid crystal molecules.

Embodiments will be described hereinafter with reference to the accompanying drawings.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

Note that, in order to make the descriptions more easily understandable, some of the drawings illustrate an X axis, a Y axis and a Z axis orthogonal to each other. A direction along the X axis is referred to as an X direction or a first direction, a direction along the Y axis is referred to as a Y direction or a second direction and direction along the Z axis is referred to as a Z direction or a third direction. A direction parallel to a X-Y plane is referred to as a horizontal direction, and a direction parallel to an X-X plane or a Y-Z plane is referred to as a vertical direction.

In the present specification, a camera module capable of calculating a distance (Hereinafter, it is simply referred to as a distance to a subject.) from a camera to a subject in an image using the image of the subject captured by the camera will be described.

As a technology for calculating the distance to the subject from the image, for example, a coded aperture technology can be used. Although detailed description is omitted, the coded aperture technology is a technology of calculating the distance to the subject by analyzing blur occurring in the image according to a position of the subject.

That is, by using the above-described coded aperture technology, it is possible to calculate the distance to the subject on the basis of the image and create a depth map indicating the distance to the subject. Incidentally, processing of calculating the distance to the subject, processing of creating the depth map, and the like are executed by a controller (CPU) that controls an operation of the camera module or a controller of an electronic device connected to the camera module (electronic device on which the camera module is mounted).

Figure 1:
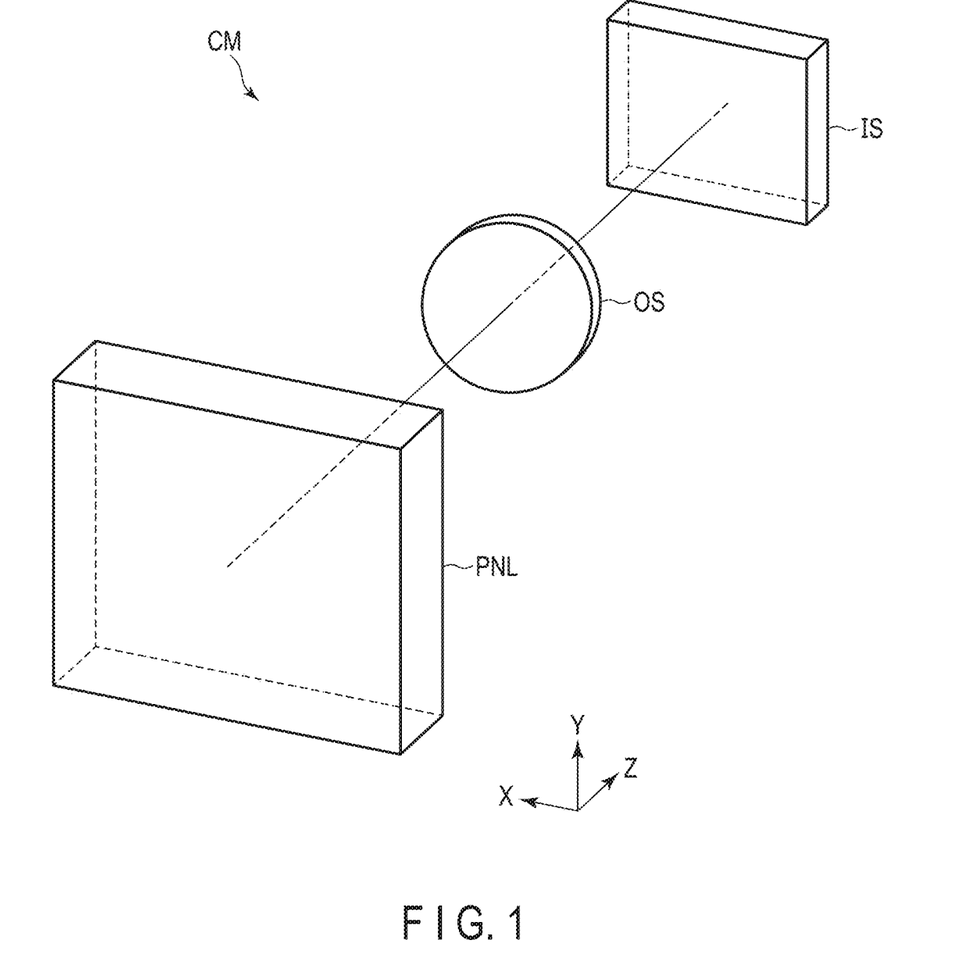
FIG. 1 is an exploded perspective view illustrating an example of a configuration of a camera module according to an embodiment.

FIG. 1 is an exploded perspective view illustrating an example of a configuration of a camera module CM according to an embodiment. As shown in FIG. 1, the camera module CM includes a liquid crystal panel PNL, an image sensor (imaging element) IS disposed on a back side of the liquid crystal panel PNL, and an optical system OS interposed between the liquid crystal panel PNL and the image sensor IS. In other words, in the camera module CM, the liquid crystal panel PNL, the optical system OS, and the image sensor IS are disposed in this order along the third direction Z. The optical system OS includes at least one lens, and the optical system OS and the image sensor IS constitute a camera that captures an image.

Although details will be described later, the liquid crystal panel PNL includes a first substrate (array substrate), a second substrate (counter-substrate), and a liquid crystal layer interposed between the first substrate and the second substrate. The liquid crystal layer is guest-host liquid crystal. The liquid crystal panel PNL according to the present embodiment supports a normally open mode in which the liquid crystal panel PNL enters a transparent state (transmissive state) when no electric field acts on the liquid crystal layer, and enters an absorption state (colored state, light-blocked state, dimmed state) when an electric field acts on the liquid crystal layer. Alternatively, the liquid crystal panel PNL according to the present embodiment supports a normally closed mode in which the liquid crystal panel PNL enters an absorption state when no electric field acts on the liquid crystal layer, and enters a transparent state when an electric field acts on the liquid crystal layer. The transparent state is a state in which light incident on the liquid crystal layer is transmitted without being almost absorbed in the liquid crystal layer. The absorption state is a state in which light incident on the liquid crystal layer is absorbed in the liquid crystal layer. Incidentally, the liquid crystal panel PNL may be driven by a passive matrix method or may be driven by an active matrix method.

In the camera module CM according to the present embodiment, when the liquid crystal panel PNL is in the transparent state, light transmitted through the liquid crystal panel PNL and the optical system OS enters the image sensor IS. As a result, the camera module CM can capture an image based on the light incident on the image sensor IS.

In contrast, when the liquid crystal panel PNL is in the absorption state, a coded aperture pattern is displayed on the liquid crystal panel PNL, and a large number of incident light control areas are formed. In other words, the light transmitted through the liquid crystal panel PNL in which the coded aperture pattern is displayed and the optical system OS is incident on the image sensor IS. As a result, the camera module CM can calculate the distance to the subject from the image based on the light incident on the image sensor IS by the above-described coded aperture technology.

Incidentally, FIG. 1 is a diagram for explaining a positional relationship in the third direction Z among the liquid crystal panel PNL, the optical system OS, and the image sensor IS, and FIG. 1 simply illustrates the sizes, shapes, and the like of the liquid crystal panel PNL, the optical system OS, and the image sensor IS.

Figure 2:
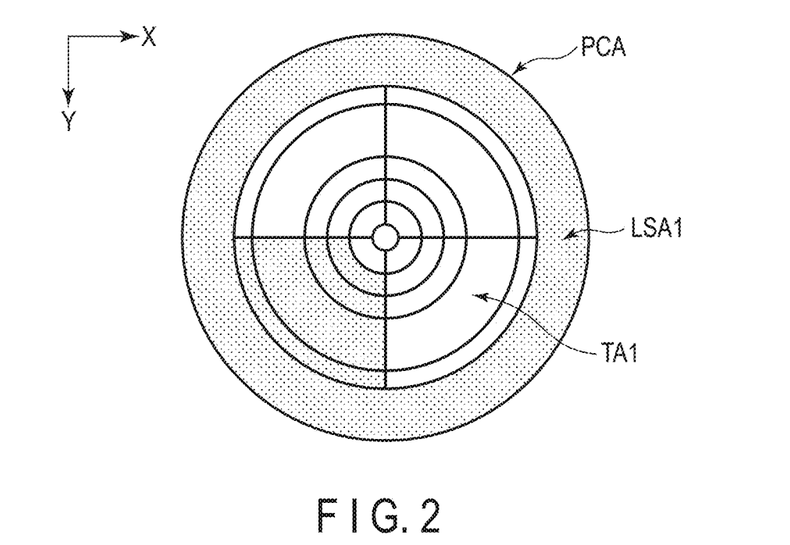
FIG. 2 is a plan view illustrating a pattern example of an incident light control area formed in a liquid crystal panel.
Figure 3:
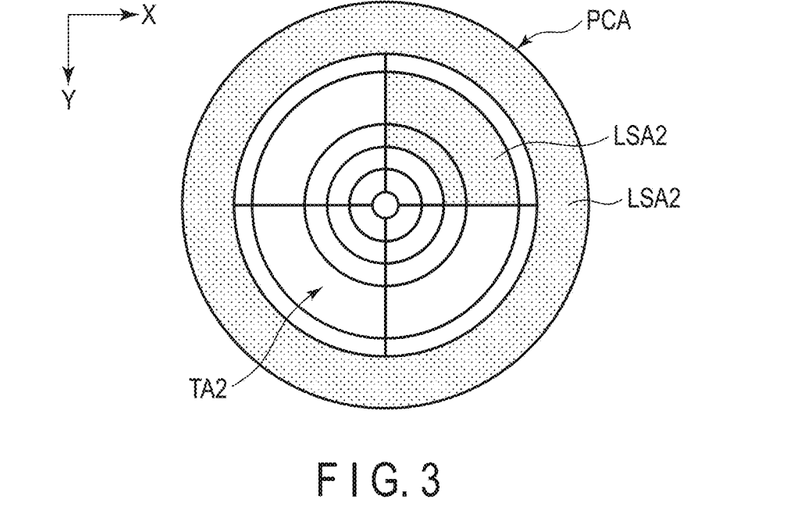
FIG. 3 is a plan view illustrating another pattern example of the incident light control area formed in the liquid crystal panel.

FIGS. 2 and 3 are plan views illustrating pattern examples of the incident light control areas PCA formed in the liquid crystal panel PNL. The incident light control area PCA includes a light shielding area LSA that shields incident light incident on the image sensor IS, and a light transmissive area TA through which the incident light incident on the image sensor IS is transmitted. The incident light control area PCA has, for example, a circular shape, and the light shielding area LSA includes at least an annular part located at an outermost periphery of the incident light control area PCA. In FIGS. 2 and 3, dotted areas correspond to the light shielding area LSA, and other areas correspond to the light transmissive area TA. Incidentally, in FIG. 2, the dotted area may be referred to as a first light shielding area LSA1, and an area other than the first light shielding area LSA1 may be referred to as a first light transmissive area TA1. In addition, in FIG. 3, the dotted areas may be referred to as second light shielding areas LSA2, and an area other than the second light shielding areas LSA2 may be referred to as a second light transmissive area TA2. As described above, the incident light control area PCA is formed when the liquid crystal panel PNL is in the absorption state. For example, in a case where the liquid crystal panel PNL supports the normally open mode, the light shielding area LSA included in the incident light control area PCA is formed by applying a voltage to an electrode disposed at a position overlapping with the light shielding area LSA and driving the liquid crystal layer. In contrast, in a case where the liquid crystal panel PNL supports the normally closed mode, the light shielding area LSA included in the incident light control area PCA is formed when a voltage is not applied to the electrode disposed at the position overlapping the light shielding area LSA and the liquid crystal layer is not driven.

Incidentally, the pattern of the incident light control area PCA formed in the liquid crystal panel PNL is not limited to the patterns illustrated in FIGS. 2 and 3, and any pattern can be applied.

Figure 4:
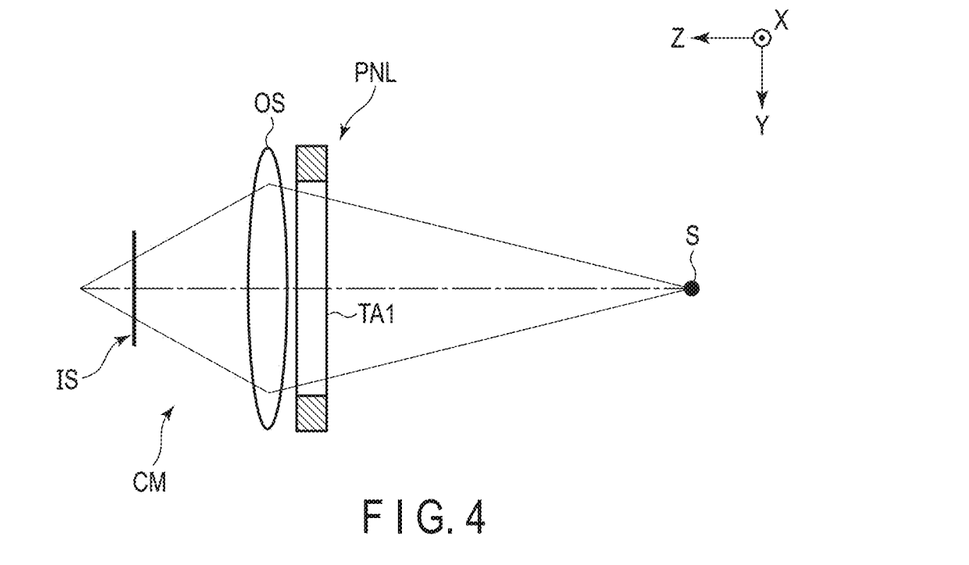
FIG. 4 is a diagram for explaining a principle of calculating a distance to a subject using the camera module.

Here, a principle of calculating the distance to the subject using the image captured by the camera module CM will be briefly described with reference to FIG. 4. FIG. 4 illustrates a positional relationship between the camera module CM and a subject S. As described above, the camera module CM includes the liquid crystal panel PNL, the image sensor IS, and the optical system OS interposed between the liquid crystal panel PNL and the image sensor IS.

Here, it is assumed that the distance of the subject S illustrated in FIG. 4 is calculated. In general, in a camera, the subject S can be captured in a state where the subject S is in focus by changing a distance between the optical system OS and the image sensor IS. However, as shown in FIG. 4, in a case where the subject S is captured in a state where the subject S is not in focus, a focal position and a position of an imaging plane of the image sensor IS deviate from each other, so that blurring occurs in an image based on light incident on the image sensor IS.

According to the above-described coded aperture technology, the distance to the subject S is calculated based on the blur occurring in the image as described above.

Incidentally, FIG. 4 illustrates a case where light is transmitted through the first light transmissive area TA1, but for example, as described above, by preparing two light transmissive areas (first light transmissive area TA1 and second light transmissive area TA2) and calculating the distance to the subject using a plurality of images (that is, a plurality of blurring patterns based on light transmitted through different light transmissive areas) based on light transmitted through each of the two light transmissive areas, a calculation accuracy of the distance (distance measurement accuracy) can be improved.

Figure 5:
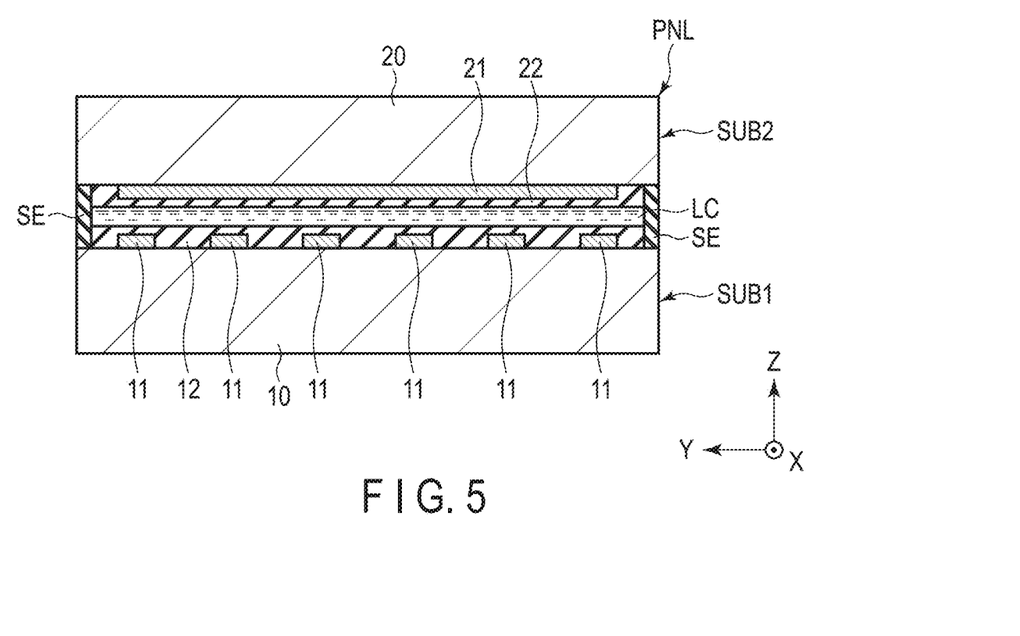
FIG. 5 is a schematic cross-sectional view of the liquid crystal panel.

Next, a configuration example of the liquid crystal panel PNL will be described. FIG. 5 is a schematic cross-sectional view of the liquid crystal panel PNL illustrated in FIG. 1.

The liquid crystal panel PNL includes a first substrate SUB1, a second substrate SUB2, a liquid crystal layer LC, and a sealant SE. The first substrate SUB1 and the second substrate SUB2 face each other. The liquid crystal layer LC is interposed between the first substrate SUB1 and the second substrate SUB2. The sealant SE bonds the first substrate SUB1 and the second substrate SUB2 to seal the liquid crystal layer LC. Incidentally, the liquid crystal panel PNL is not provided with a color filter or a light source as long as the liquid crystal panel PNL can display the coded aperture pattern and does not need to display a visible image.

The first substrate SUB1 includes a transparent substrate 10, a pixel electrode 11 (first electrode), and an alignment film 12 (first alignment film). The second substrate SUB2 includes a transparent substrate 20, a common electrode 21 (second electrode), and an alignment film 22 (second alignment film). The pixel electrode 11 and the common electrode 21 face each other. The alignment film 12 covers the pixel electrode 11 and is in contact with the liquid crystal layer LC. The alignment film 22 covers the common electrode 21 and is in contact with the liquid crystal layer LC. The pixel electrode 11 and the common electrode 21 are made of a transparent conductive material such as indium tin oxide (ITO) or indium zinc oxide (IZO). The alignment films 12 and 22 are formed of, for example, a polyimide film.

Figure 6A:
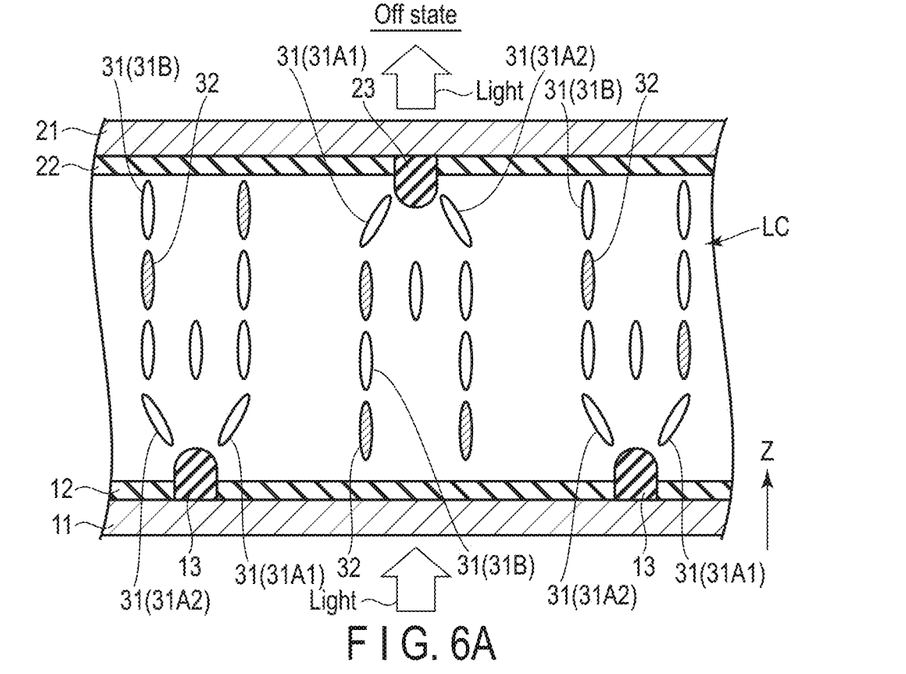
FIG. 6A is a cross-sectional view schematically illustrating a liquid crystal layer in an off state of the liquid crystal panel supporting a normally open mode.
Figure 6B:
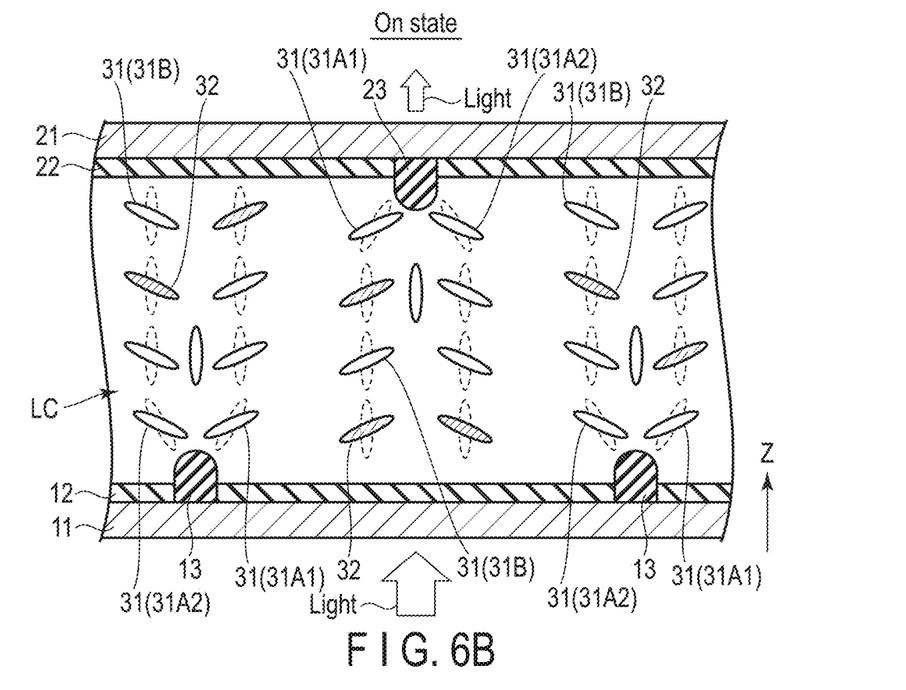
FIG. 6B is a cross-sectional view schematically illustrating a liquid crystal layer in an on state of the liquid crystal panel supporting a normally open mode.

FIG. 6 is a cross-sectional view schematically illustrating the liquid crystal layer LC in an off state and the liquid crystal layer LC in an on state included in the liquid crystal panel PNL supporting the normally open mode.

FIG. 6A is a cross-sectional view schematically illustrating the liquid crystal layer LC in the off state. The off state corresponds to a state in which no voltage is applied to the liquid crystal layer LC (For example, a potential difference between the pixel electrode 11 and the common electrode 21 is substantially 0.).

The liquid crystal layer LC includes liquid crystal molecules 31 (host liquid crystal) and dichroic dye molecules 32 (guest liquid crystal). Since the alignment films 12 and 22 are vertical alignment films (In other words, a vertical alignment film having an alignment restriction force along the third direction Z) having a pretilt angle of 90°, the liquid crystal molecules 31 contained in the liquid crystal layer LC in the off state are aligned such that a long axis thereof is substantially along the vertical direction except for the liquid crystal molecules in the vicinity of a protruding portion described later. The dichroic dye molecules 32 are aligned following the liquid crystal molecules 31. For this reason, the dichroic dye molecules 32 contained in the liquid crystal layer LC in the off state follow the liquid crystal molecules 31 and are aligned such that a long axis thereof is substantially along the vertical direction.

As described above, since the alignment films 12 and 22 are vertical alignment films, the liquid crystal molecules 31 are negative liquid crystal molecules having negative dielectric anisotropy. The dichroic dye molecules 32 may be formed of a single material or may be formed of a plurality of materials. Here, a case where the dichroic dye molecules 32 are a black dye obtained by mixing a plurality of materials having different absorption wavelengths, specifically, dyes such as cyan, magenta, and yellow is assumed. The dichroic dye molecules 32 have different absorption of light (absorbance) in an axial direction, transmit light in a short axis direction, and absorb light in a long axis direction. In other words, the dichroic dye molecules 32 have an absorption axis along the long axis of the liquid crystal molecules 31, and when the liquid crystal molecules 31 are vertically aligned, they are also vertically aligned and transmit light (hardly absorb light), and when the liquid crystal molecules 31 are horizontally aligned, they are also horizontally aligned and absorb light.

The first substrate SUB1 has a protruding portion 13 protruding from the pixel electrode 11 toward the liquid crystal layer LC. The second substrate SUB2 has a protruding portion 23 that protrudes from the common electrode 21 toward the liquid crystal layer LC. The protruding portions 13 and 23 are formed of an insulating material. Incidentally, an interval between the protruding portion 13 and the protruding portion 23 adjacent to each other in planar view is desirably about several tens of μm to about 100 μm when sizes of the protruding portions 13 and 23 are about 10 μm.

An alignment direction of the liquid crystal molecules 31 contained in the liquid crystal layer LC in the off state is different between liquid crystal molecules 31A located near the protruding portions 13 and 23 and liquid crystal molecules 31B located away from the protruding portions 13 and 23. That is, the alignment direction of the liquid crystal molecules 31 contained in the liquid crystal layer LC in the off state is different between the liquid crystal molecules 31A in the vicinity of the protruding portions 13 and 23 and other liquid crystal molecules 31B.

The liquid crystal molecules 31B located away from the protruding portions 13 and 23 are aligned in the vertical direction according to the alignment restriction force of the alignment films 12 and 22 which are vertical alignment films.

In contrast, in addition to the alignment restriction force by the alignment films 12 and 22 which are vertical alignment films, a force caused by the protruding portions 13 and 23 is applied to the liquid crystal molecules 31A located near the protruding portions 13 and 23, and thus, the liquid crystal molecules 31A are aligned obliquely in a predetermined direction intersecting the vertical direction. A direction in which the liquid crystal molecules 31A are inclined differs depending on a positional relationship between the liquid crystal molecules 31A and the protruding portions 13 and 23. For example, in FIG. 6A, liquid crystal molecules 31A1 located on a right side as viewed from the protruding portion 13 are inclined in a right direction in the drawing, and in contrast, liquid crystal molecules 31A2 located on a left side as viewed from the protruding portion 13 are inclined in a left direction in the drawing. Similarly, liquid crystal molecules 31A1 located on a right side (left side in the drawing) as viewed from the protruding portion 23 are inclined to the right in the drawing, and liquid crystal molecules 31A2 located on a left side (right side in the drawing) as viewed from the protruding portion 23 are inclined to the left in the drawing.

In contrast, since the dichroic dye molecules 32 are aligned following the liquid crystal molecules 31, the long axes thereof are aligned substantially along the vertical direction.

As described above, when the liquid crystal layer LC is in the off state, the liquid crystal molecules 31A in the vicinity of the protruding portions 13 and 23 are aligned to be inclined in the predetermined direction, but most of the liquid crystal molecules 31 (31B) contained in the liquid crystal layer LC are aligned in the substantially vertical direction, and the dichroic dye molecules 32 aligned following the liquid crystal molecules 31 are also aligned in the substantially vertical direction. For this reason, light incident on the liquid crystal layer LC is hardly absorbed by the dichroic dye molecules 32, and passes through the liquid crystal layer LC.

FIG. 6B is a cross-sectional view schematically illustrating the liquid crystal layer LC in the on state. The on state corresponds to a state in which a voltage is applied to the liquid crystal layer LC (For example, a state in which a potential difference between the pixel electrode 11 and the common electrode 21 is larger than or equal to a threshold value.). As described above, since the liquid crystal molecules 31 are negative liquid crystal molecules, the alignment direction of the liquid crystal molecules 31 changes in a direction in which the long axis intersects (is orthogonal to) an electric field in a state where a high voltage higher than or equal to the threshold value is applied to the liquid crystal layer LC. Here, since the pixel electrode 11 and the common electrode 21 are disposed to face each other, an electric field is generated in the vertical direction in the liquid crystal layer LC in the on state. Since the liquid crystal molecules 31A of the liquid crystal molecules 31 are aligned to be inclined in the predetermined direction at the time when the liquid crystal layer LC is in the off state, when the liquid crystal layer LC is in the on state, the liquid crystal molecules 31A are further inclined in the predetermined direction, and the alignment direction of the liquid crystal molecules 31A changes in a direction (substantially horizontal direction) in which the long axis intersects the electric field. Among the liquid crystal molecules 31, the liquid crystal molecules 31B are also inclined in the same direction as the surrounding liquid crystal molecules 31A, and the alignment direction of the liquid crystal molecules 31B changes in a direction (substantially horizontal direction) in which the long axis intersects the electric field. Since the dichroic dye molecules 32 are aligned following the liquid crystal molecules 31, the dichroic dye molecules are inclined in the same direction as the surrounding liquid crystal molecules 31 and change in the substantially horizontal direction.

As described above, when the liquid crystal layer LC is in the on state, since the liquid crystal molecules 31 and the dichroic dye molecules 32 are aligned substantially in the horizontal direction, light incident on the liquid crystal layer LC is absorbed by the dichroic dye molecules 32 aligned in the horizontal direction, and the incident light control area PCA is formed on the liquid crystal panel PNL (the coded aperture pattern is displayed).

Figure 7A:
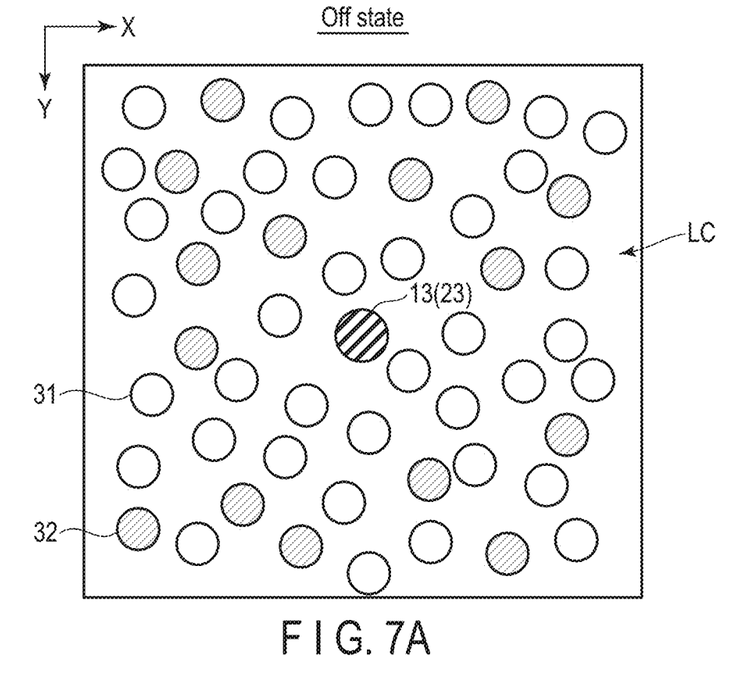
FIG. 7A is a plan view schematically illustrating the liquid crystal layer in the off state illustrated in FIG. 6A.
Figure 7B:
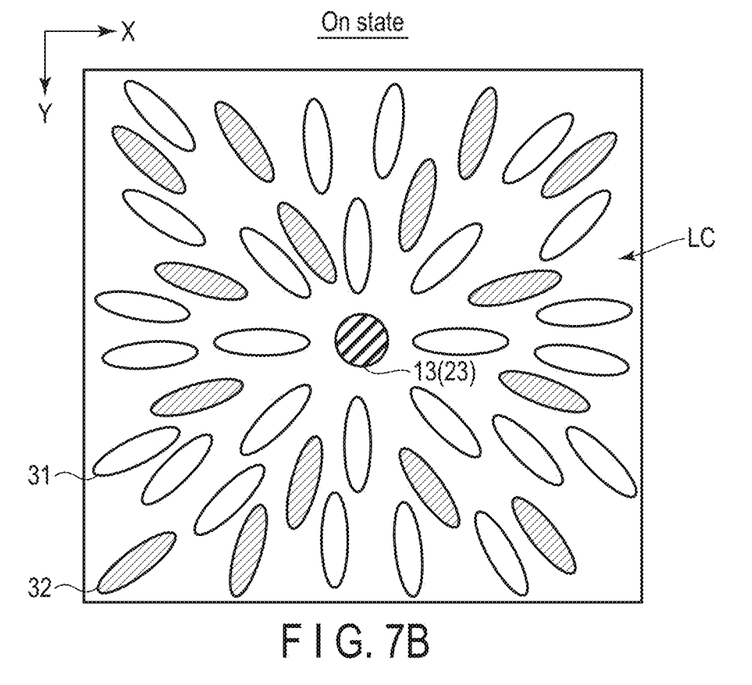
FIG. 7B is a plan view schematically illustrating the liquid crystal layer in the on state illustrated in FIG. 6B.

FIG. 7 is a plan view schematically illustrating the liquid crystal layer LC in the off state and the liquid crystal layer LC in the on state illustrated in FIG. 6.

FIG. 7A is a plan view schematically illustrating the liquid crystal layer LC in the off state. As illustrated in FIG. 6, when the liquid crystal layer LC is in the off state, the liquid crystal molecules 31 and the dichroic dye molecules 32 are aligned substantially along the vertical direction. In other words, in planar view, as illustrated in FIG. 7A, a short axis of the liquid crystal molecules 31 and a short axis of the dichroic dye molecules 32 are observed.

FIG. 7B is a plan view schematically illustrating the liquid crystal layer LC in the on state. As illustrated in FIG. 6, when the liquid crystal layer LC is in the on state, the liquid crystal molecules 31 and the dichroic dye molecules 32 are aligned substantially along the horizontal direction (direction intersecting the electric field). At this time, the liquid crystal molecules 31 are aligned in the horizontal direction by falling in a predetermined direction with the protruding portion 13 (or the protruding portion 23) as a starting point. More specifically, the liquid crystal molecules 31 are aligned such that their long axes become radial around the protruding portions 13. Since the dichroic dye molecules 32 are aligned following the nearby liquid crystal molecules 31, the dichroic dye molecules 32 are also aligned such that their long axes become radial around the protruding portion 13. In other words, in planar view, as illustrated in FIG. 7B, the long axes of the liquid crystal molecules 31 and the long axes of the dichroic dye molecules 32 radially arranged around the protruding portion 13 are observed. As described above, the liquid crystal molecules 31 and the dichroic dye molecules 32 are radially aligned around the protruding portion 13, whereby the liquid crystal panel PNL can isotropically absorb light by the dichroic dye molecules 32 in the absorption state.

In FIGS. 6 and 7, the configuration in which the protruding portions 13 and 23 are provided to control the direction in which the liquid crystal molecules 31 and the dichroic dye molecules 32 fall is exemplified, but a configuration for controlling a direction in which the liquid crystal molecules 31 and the dichroic dye molecules 32 fall is not limited thereto. Hereinafter, another configuration capable of controlling a direction in which the liquid crystal molecules 31 and the dichroic dye molecules 32 fall will be described.

Figure 8A:
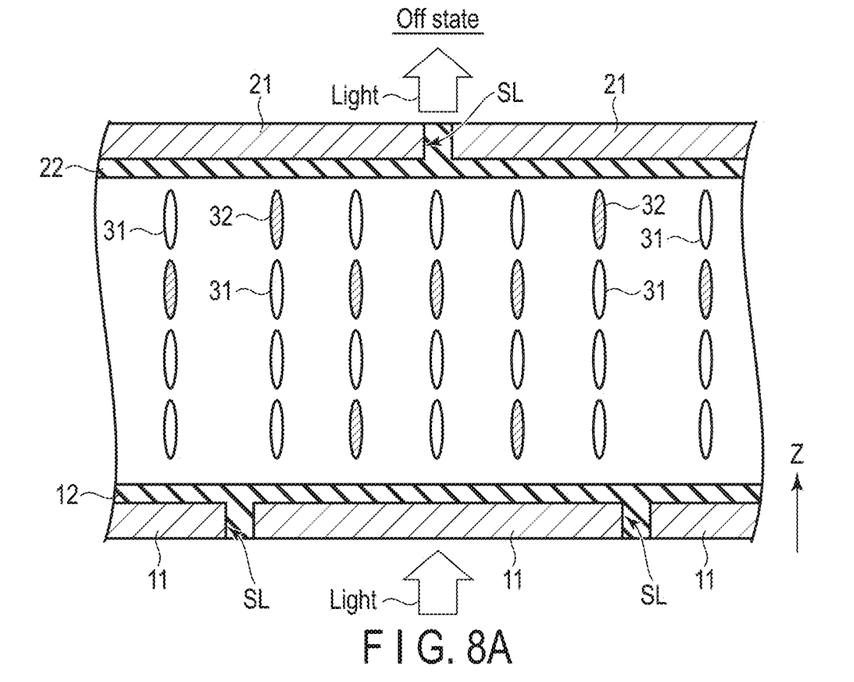
FIG. 8A is a cross-sectional views schematically illustrating the liquid crystal layer in the off state of the liquid crystal panel supporting the normally open mode.
Figure 8B:
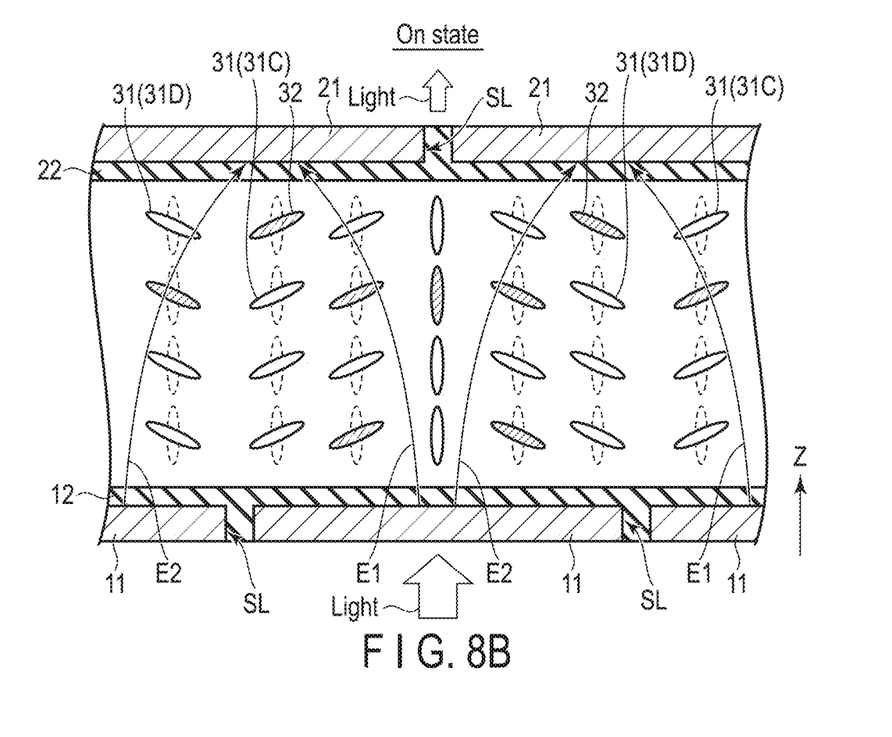
FIG. 8B is a cross-sectional views schematically illustrating the liquid crystal layer in the on state of the liquid crystal panel supporting the normally open mode.

FIG. 8 is a cross-sectional view schematically illustrating the liquid crystal layer LC in the off state and the liquid crystal layer LC in the on state included in the liquid crystal panel PNL supporting the normally open mode. The liquid crystal panel PNL illustrated in FIG. 8 is different from the configuration illustrated in FIGS. 6 and 7 in that slits SL are formed in the pixel electrode 11 and the common electrode 21 instead of the protruding portions 13 and 23 illustrated in FIGS. 6 and 7.

FIG. 8A is a cross-sectional view schematically illustrating the liquid crystal layer LC in the off state. The liquid crystal layer LC includes the liquid crystal molecules 31 and the dichroic dye molecules 32. The alignment films 12 and 22 are vertical alignment films having a pretilt angle of 90°, and the liquid crystal molecules 31 contained in the liquid crystal layer LC in the off state are aligned such that the long axis thereof is along the vertical direction. Since the dichroic dye molecules 32 are aligned following the liquid crystal molecules 31, similarly to the liquid crystal molecules 31, the dichroic dye molecules are aligned such that the long axis thereof is along the vertical direction. As described above, here, since it is assumed that the alignment films 12 and 22 are vertical alignment films, the liquid crystal molecules 31 are negative liquid crystal molecules.

As described above, when the liquid crystal layer LC is in the off state, the liquid crystal molecules 31 contained in the liquid crystal layer LC are aligned in the vertical direction, and the dichroic dye molecules 32 aligned following the liquid crystal molecules 31 are also aligned in the vertical direction. For this reason, light incident on the liquid crystal layer LC is hardly absorbed by the dichroic dye molecules 32, and passes through the liquid crystal layer LC.

FIG. 8B is a cross-sectional view schematically illustrating the liquid crystal layer LC in the on state. As described above, the slits SL are formed in the pixel electrode 11 and the common electrode 21. For this reason, in the liquid crystal layer LC in the on state, a distorted oblique electric field is generated. In FIG. 8B, an oblique electric field E1 distorted in a left direction in the drawing and an oblique electric field E2 distorted in a right direction in the drawing are generated between the pixel electrode 11 and the common electrode 21. Among the liquid crystal molecules 31, liquid crystal molecules 31C on which the oblique electric field E1 acts are aligned in a substantially horizontal direction with its long axis inclined in a direction intersecting with the oblique electric field E1 (right direction in the drawing). In addition, among the liquid crystal molecules 31, liquid crystal molecules 31D on which the oblique electric field E2 acts are aligned in a substantially horizontal direction with its long axis inclined in a direction intersecting with the oblique electric field E2 (left direction in the drawing). Since the dichroic dye molecules 32 are aligned following the liquid crystal molecules 31, the dichroic dye molecules 32 located around the liquid crystal molecules 31C are inclined in the same direction as the liquid crystal molecules 31C and become substantially horizontal, and the dichroic dye molecules 32 located around the liquid crystal molecules 31D are inclined in the same direction as the liquid crystal molecules 31D and become substantially horizontal.

As described above, when the liquid crystal layer LC is in the on state, since the liquid crystal molecules 31 and the dichroic dye molecules 32 are aligned substantially in the horizontal direction, light incident on the liquid crystal layer LC is absorbed by the dichroic dye molecules 32 aligned in the horizontal direction, and the incident light control area PCA is formed on the liquid crystal panel PNL (the coded aperture pattern is displayed).

Figure 9A:
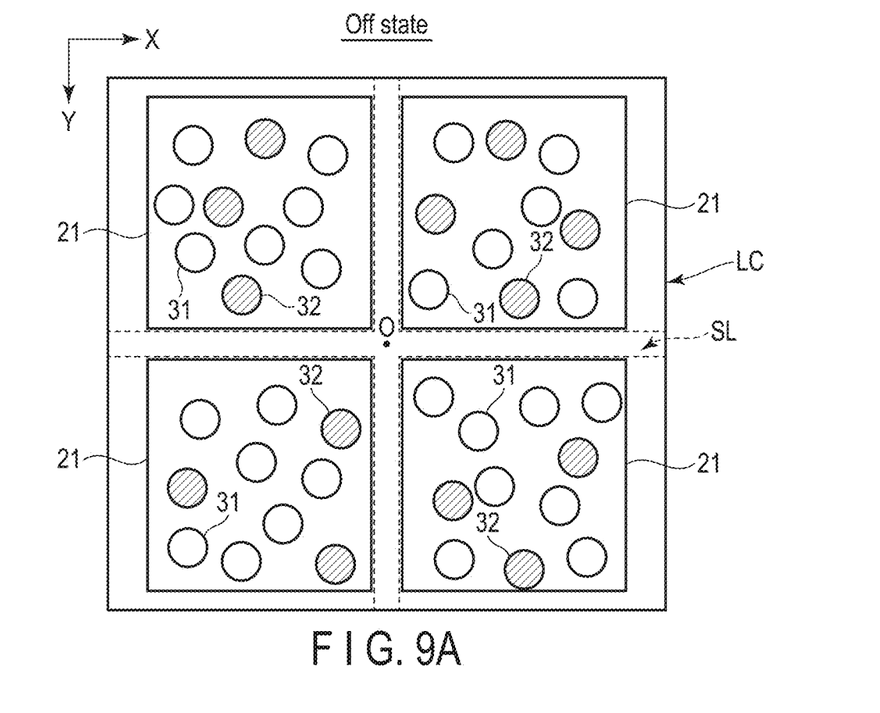
FIG. 9A is a plan view schematically illustrating the liquid crystal layer in the off state illustrated in FIG. 8A.
Figure 9B:
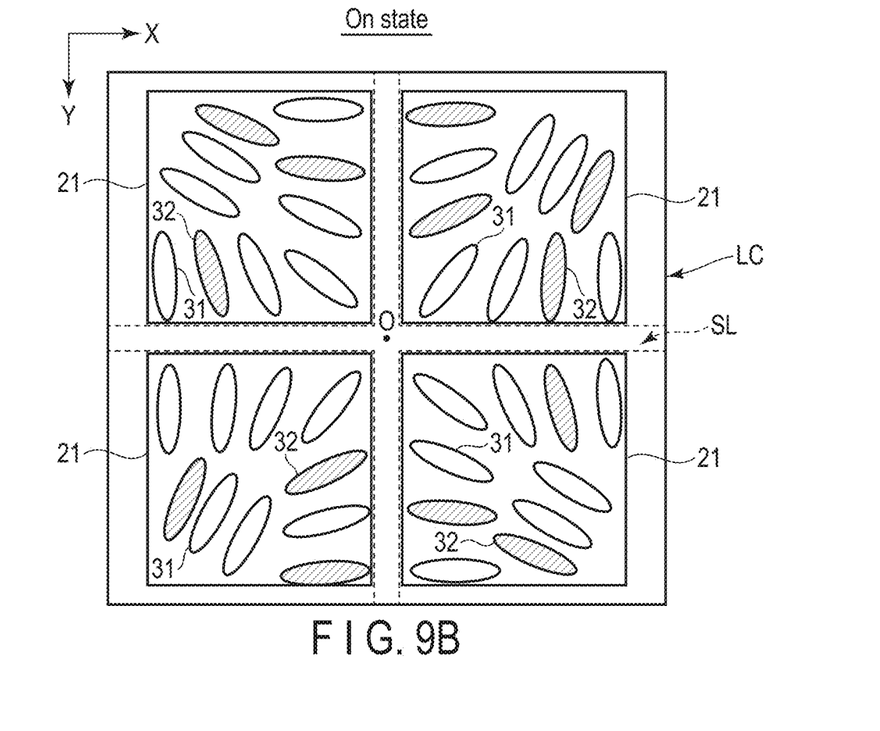
FIG. 9B is a plan view schematically illustrating the liquid crystal layer in the on state illustrated in FIG. 8B.

FIG. 9 is a plan view schematically illustrating the liquid crystal layer LC in the off state and the liquid crystal layer LC in the on state illustrated in FIG. 8.

FIG. 9A is a plan view schematically illustrating the liquid crystal layer LC in the off state. As illustrated in FIG. 8, when the liquid crystal layer LC is in the off state, the liquid crystal molecules 31 and the dichroic dye molecules 32 are aligned along the vertical direction. In other words, in planar view, as illustrated in FIG. 9A, a short axis of the liquid crystal molecules 31 and a short axis of the dichroic dye molecules 32 are observed.

FIG. 9B is a plan view schematically illustrating the liquid crystal layer LC in the on state. As illustrated in FIG. 8, when the liquid crystal layer LC is in the on state, the liquid crystal molecules 31 and the dichroic dye molecules 32 are inclined in a direction intersecting with the oblique electric field and are aligned in a substantially horizontal direction. At this time, the liquid crystal molecules 31 are aligned in the horizontal direction by falling in a predetermined direction with a point O of intersection of the slits formed in the common electrode 21 as a starting point. More specifically, the liquid crystal molecules 31 are aligned such that their long axes become radial around the point O of intersection. Since the dichroic dye molecules 32 are aligned following the nearby liquid crystal molecules 31, the dichroic dye molecules 32 are also aligned such that their long axes become radial about the point O of intersection. In other words, in planar view, as illustrated in FIG. 9B, the long axes of the liquid crystal molecules 31 and the long axes of the dichroic dye molecules 32 radially arranged around the point O of intersection are observed. As described above, the liquid crystal molecules 31 and the dichroic dye molecules 32 are radially aligned around the point O of intersection, whereby the liquid crystal panel PNL can isotropically absorb light by the dichroic dye molecules 32 in the absorption state. Incidentally, though not shown in FIG. 9, the pixel electrode 11 is disposed at a position overlapping with the point O of intersection in planar view.

As described above, the camera module CM according to the present embodiment includes the liquid crystal panel PNL having the liquid crystal layer LC of the guest-host liquid crystal, the optical system OS, and the image sensor IS, and a large number of incident light control areas PCA are formed in the liquid crystal panel PNL when the liquid crystal layer LC is in the on state. For this reason, the camera module CM can function as a distance measuring sensor that calculates the distance to the subject from the image based on the light incident on the image sensor IS when the liquid crystal layer LC is in the on state, and can function as a camera that captures the image based on the light incident on the image sensor IS when the liquid crystal layer LC is in the off state.

Since the liquid crystal layer LC of the guest-host liquid crystal does not require a polarizer, the liquid crystal layer LC has a feature of having higher transmittance than other liquid crystal layers that require a polarizer. For this reason, in a case where the camera module CM functions as a camera, more light can be incident on the image sensor IS as compared with a case where another camera module using a liquid crystal panel having another liquid crystal layer functions as a camera, and a high-quality image can be captured.

In addition, since the liquid crystal panel PNL provided in the camera module CM according to the present embodiment has a configuration (the protruding portions 13 and 23 or the slits SL) capable of controlling the alignment direction of the liquid crystal molecules 31 and the dichroic dye molecules 32 contained in the liquid crystal layer LC, for example, as illustrated in FIGS. 7 and 9, the liquid crystal molecules 31 and the dichroic dye molecules 32 can be radially aligned, and light absorption by the dichroic dye molecules 32 can be made isotropic. According to this, as compared with a configuration in which the liquid crystal molecules 31 and the dichroic dye molecules 32 are inclined only in a predetermined direction and aligned in the horizontal direction, and light is not isotropically absorbed by the dichroic dye molecules 32, the distance to the subject can be calculated with high accuracy (In other words, it is possible to improve the distance measurement accuracy when the camera module CM functions as a distance measurement sensor.).

However, even in the configuration in which the liquid crystal molecules 31 and the dichroic dye molecules 32 are inclined only in a predetermined direction and aligned in the horizontal direction, and light is not isotropically absorbed by the dichroic dye molecules 32, the above-described configuration (the protruding portions 13 and 23 or the slits SL) capable of controlling the alignment direction may be omitted as long as the above-described distance measurement accuracy can be sufficiently secured. In this case, in order to incline the liquid crystal molecules 31 and the dichroic dye molecules 32 only in a predetermined direction (in order to prevent the liquid crystal molecules 31 and the dichroic dye molecules 32 from falling in a random direction), the alignment films 12 and 22, which are vertical alignment films, are desirably subjected to alignment treatment. The alignment treatment may be rubbing treatment or photo-alignment treatment.

First Modified Example

Figure 10A:
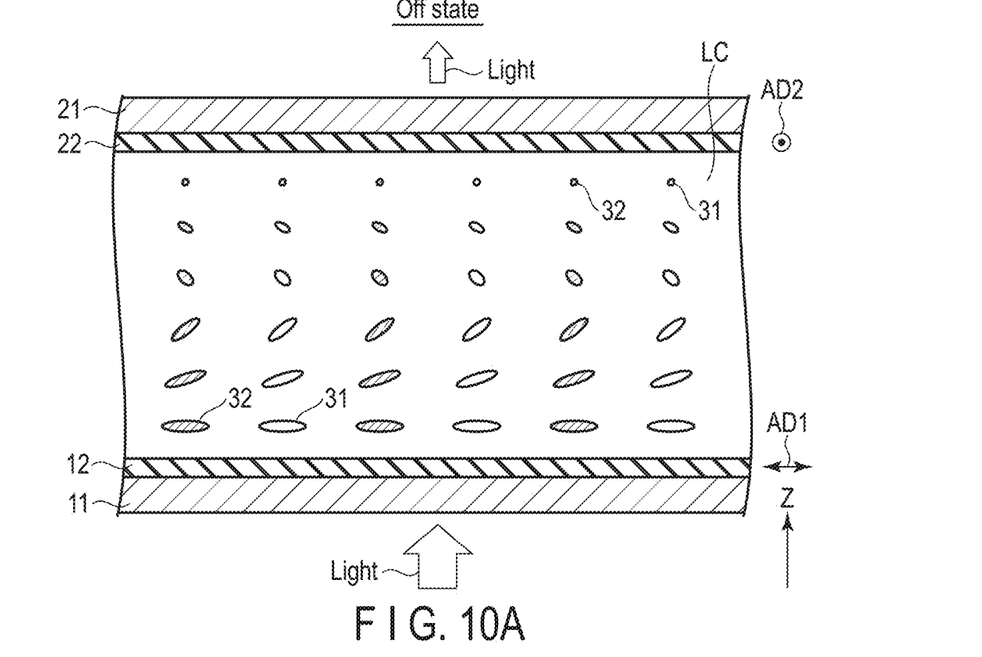
FIG. 10A is a cross-sectional view schematically illustrating the liquid crystal layer in the off state of the liquid crystal panel supporting a normally closed mode.
Figure 10B:
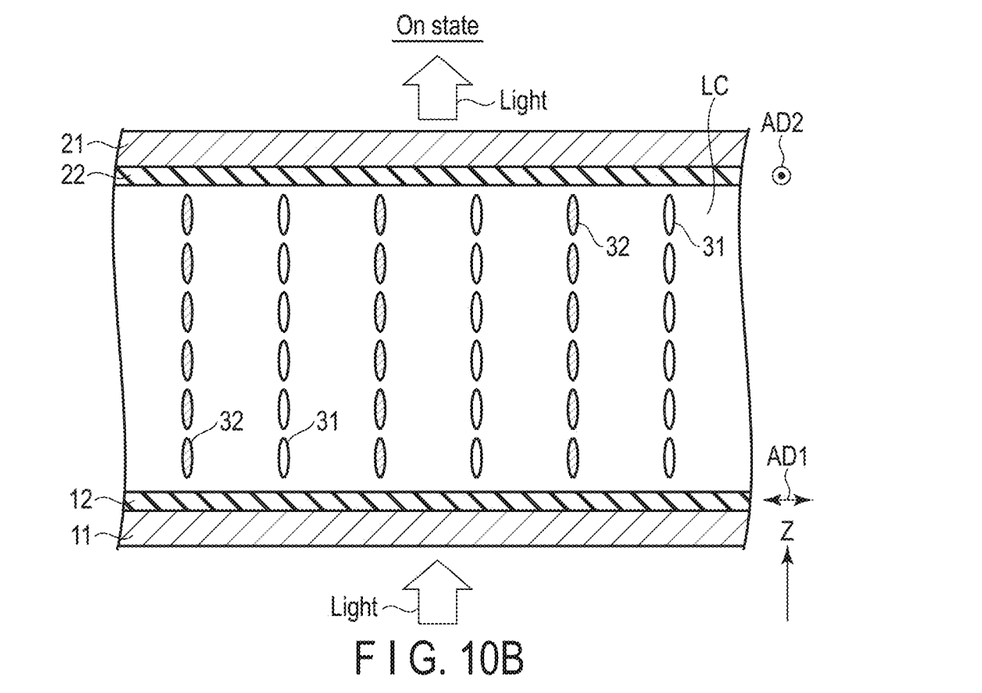
FIG. 10B is a cross-sectional view schematically illustrating the liquid crystal layer in the on state of the liquid crystal panel supporting a normally closed mode.

In the present embodiment described above, the case where the liquid crystal panel PNL supports the normally open mode has been described. However, as described above, the liquid crystal panel PNL may support the normally closed mode. Hereinafter, a case where the liquid crystal panel PNL supports the normally closed mode will be described with reference to FIG. 10.

FIG. 10 is a cross-sectional view schematically illustrating the liquid crystal layer LC in the off state and the liquid crystal layer LC in the on state included in the liquid crystal panel PNL supporting the normally closed mode. When the liquid crystal panel PNL supports the normally closed mode, the liquid crystal panel PNL enters the absorption state when the liquid crystal layer LC is in the off state, and enters the transparent state when the liquid crystal layer LC is in the on state. In other words, the liquid crystal molecules 31 and the dichroic dye molecules 32 contained in the liquid crystal layer LC need to be aligned in the horizontal direction when the liquid crystal layer LC is in the off state, and a horizontal alignment film is applied to the alignment films 12 and 22. In FIG. 10, it is assumed that an alignment treatment direction AD1 of the alignment film 12 and an alignment treatment direction AD2 of the alignment film 22 are different from each other, and the alignment treatment directions AD1 and AD2 are orthogonal to each other. Incidentally, the alignment treatment may be rubbing treatment or photo-alignment treatment.

In FIG. 10, it is assumed that a chiral agent is added to the liquid crystal molecules 31 and the dichroic dye molecules 32 contained in the liquid crystal layer LC, and the liquid crystal molecules 31 and the dichroic dye molecules 32 are twisted and aligned. More specifically, it is assumed that the liquid crystal molecules 31 and the dichroic dye molecules 32 are twisted and aligned at 90° between the alignment films 12 and 22.

FIG. 10A is a cross-sectional view schematically illustrating the liquid crystal layer LC in the off state. As shown in FIG. 10A, a long axis of the liquid crystal molecules 31 is parallel to the horizontal direction although a direction thereof is rotated by 90° between the alignment films 12 and 22. Since the dichroic dye molecules 32 are aligned following the liquid crystal molecules 31, a long axis of the dichroic dye molecules 32 also rotates by 90° between the alignment films 12 and 22, but both are parallel to the horizontal direction. In other words, when the liquid crystal layer LC is in the off state, the liquid crystal molecules 31 and the dichroic dye molecules 32 are aligned in the horizontal direction. For this reason, the light incident on the liquid crystal layer LC is absorbed by the dichroic dye molecules 32 aligned in the horizontal direction, and the incident light control area PCA is formed on the liquid crystal panel PNL (the coded aperture pattern is displayed).

FIG. 10B is a cross-sectional view schematically illustrating the liquid crystal layer LC in the on state. As described above, when the liquid crystal panel PNL supports the normally closed mode, since the alignment films 12 and 22 are horizontal alignment films, the liquid crystal molecules 31 are positive liquid crystal molecules having positive dielectric anisotropy. For this reason, an alignment direction of the liquid crystal molecules 31 changes such that the long axis thereof faces a direction parallel to an electric field in a state where a high voltage higher than or equal to a threshold value is applied to the liquid crystal layer LC. Here, since the pixel electrode 11 and the common electrode 21 are disposed to face each other and an electric field is generated in the vertical direction, the long axis of the liquid crystal molecules 31 changes so as to face a direction parallel to the vertical direction. In other words, when the liquid crystal layer LC is in the on state, the liquid crystal molecules 31 and the dichroic dye molecules 32 are aligned in the vertical direction. For this reason, light incident on the liquid crystal layer LC is hardly absorbed by the dichroic dye molecules 32, and passes through the liquid crystal layer LC.

As described above, even when the liquid crystal panel PNL supports the normally closed mode, there is no difference in that the liquid crystal layer LC contains the liquid crystal molecules 31 and the dichroic dye molecules 32. Therefore, the liquid crystal layer LC does not require a polarizer, and when the camera module CM functions as a camera, a high-quality image can be captured. In addition, the liquid crystal layer LC in the present modified example includes the twist-aligned liquid crystal molecules 31 and the dichroic dye molecules 32, and when the liquid crystal layer LC is in the off state, the orientations of the long axes thereof are shifted by, for example, 90° between the alignment films 12 and 22. According to this, it is possible to absorb light isotropically as compared with a configuration in which the liquid crystal molecules 31 and the dichroic dye molecules 32 are horizontally aligned only in a predetermined direction, and it is possible to calculate the distance to the subject with high accuracy (In other words, it is possible to improve the distance measurement accuracy when the camera module CM functions as a distance measurement sensor.).

Incidentally, the long axes of the liquid crystal molecules 31 and the dichroic dye molecules 32 may be twisted and aligned at any angle such as 1800 or 270° in addition to 90°.

However, even in a configuration in which the liquid crystal molecules 31 and the dichroic dye molecules 32 are horizontally aligned only in a predetermined direction and light is not isotropically absorbed by the dichroic dye molecules 32, the liquid crystal molecules 31 and the dichroic dye molecules 32 may not be twisted and aligned as long as the above-described distance measurement accuracy can be sufficiently secured. In other words, the alignment treatment directions AD1 and AD2 of the alignment films 12 and 22, which are horizontal alignment films, may be the same, and the above-described chiral agent may not be added.

Second Modified Example

In the present embodiment described above, the case where the camera module CM includes one liquid crystal panel PNL has been described, but the camera module CM may include two liquid crystal panels PNL. Hereinafter, a case where the camera module CM includes two liquid crystal panels PNL1 and PNL2 will be described with reference to FIG. 11.

Figure 11:
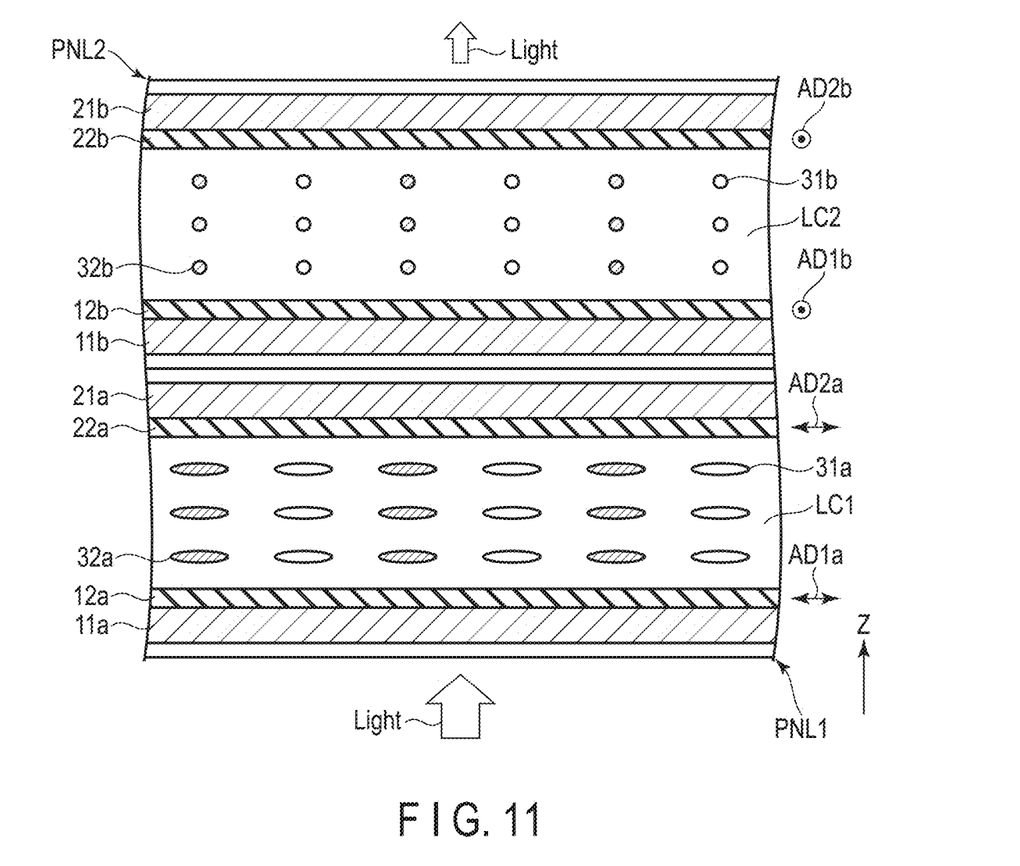
FIG. 11 is a diagram for explaining a case where the camera module includes two liquid crystal panels.

FIG. 11 is a diagram illustrating the two liquid crystal panels PNL1 and PNL2 provided in the camera module CM, in which liquid crystal molecules 31a (first liquid crystal molecules) and dichroic dye molecules 32a (first dichroic dye molecules) of a liquid crystal layer LC1 (first liquid crystal layer) included in the liquid crystal panel PNL1 (first liquid crystal panel), and liquid crystal molecules 31b (second liquid crystal molecules) and dichroic dye molecules 32b (second dichroic dye molecules) of a liquid crystal layer LC2 (second liquid crystal layer) included in the liquid crystal panel PNL2 (second liquid crystal panel) are aligned in the horizontal direction. Incidentally, it is assumed that both the liquid crystal panels PNL1 and PNL2 support the normally closed mode, but the present invention is not limited thereto, and both the liquid crystal panels PNL1 and PNL2 may support the normally open mode.

In this case, an alignment treatment direction AD1a of an alignment film 12a included in the liquid crystal panel PNL1 is the same as an alignment treatment direction AD2a of an alignment film 22a, and the liquid crystal molecules 31a and the dichroic dye molecules 32a contained in the liquid crystal layer LC1 are aligned in the horizontal direction toward the alignment treatment direction. In addition, an alignment treatment direction AD1b of an alignment film 12b included in the liquid crystal panel PNL2 is the same as an alignment treatment direction AD2b of an alignment film 22b, and the liquid crystal molecules 31b and the dichroic dye molecules 32b contained in the liquid crystal layer LC2 are aligned in the horizontal direction toward the alignment treatment direction.

In contrast, the alignment treatment directions AD1a and AD2a in the liquid crystal panel PNL1 and the alignment treatment directions AD1b and AD2b in the liquid crystal panel PNL2 are different from each other, and the alignment treatment directions AD1a and AD2a are orthogonal to the alignment treatment directions AD1b and AD2b. For this reason, the liquid crystal molecules 31a and the dichroic dye molecules 32a of the liquid crystal layer LC1 included in the liquid crystal panel PNL1 are aligned in the horizontal direction while facing a direction rotated by 90° from a direction in which the liquid crystal molecules 31b and the dichroic dye molecules 32b of the liquid crystal layer LC2 included in the liquid crystal panel PNL2 face. Similarly, the liquid crystal molecules 31b and the dichroic dye molecules 32b of the liquid crystal layer LC2 included in the liquid crystal panel PNL2 are aligned in the horizontal direction while facing a direction rotated by 90° from a direction in which the liquid crystal molecules 31a and the dichroic dye molecules 32a of the liquid crystal layer LC1 included in the liquid crystal panel PNL1 face.

According to this, light can be isotropically absorbed by the dichroic dye molecules 32a and 32b included in the two liquid crystal panels PNL1 and PNL2, and the distance to the subject can be accurately calculated (In other words, it is possible to improve the distance measurement accuracy when the camera module CM functions as a distance measurement sensor.) without the configuration in which a chiral agent is added and the dichroic dye molecules 32 are twisted and aligned as in the above-described first modified example.

Incidentally, also in the present modified example, since there is no change in that the two liquid crystal panels PNL1 and PNL2 both include the liquid crystal layer LC containing the liquid crystal molecules 31 and the dichroic dye molecules 32, it is possible to capture a high-quality image when the camera module CM functions as a camera.

According to the embodiment described above, it is possible to provide the camera module CM including the liquid crystal panel PNL having high transmittance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A camera module comprising:
a liquid crystal panel that displays a coded aperture pattern;
an image sensor; and
an optical system interposed between the liquid crystal panel and the image sensor,
wherein the liquid crystal panel includes a liquid crystal layer containing liquid crystal molecules and dichroic dye molecules aligned following the liquid crystal molecules, without a polarizer,
the liquid crystal panel has a light control area which is circular shape,
the light control area has area divided concentric and radial direction, and an annular portion which is not divided and located at the outermost periphery of the light control area,
the coded aperture pattern displayed in the light control area has a light shielding area and a light transmissive area, and
the image sensor captures a blurred image through the coded aperture pattern to calculate distance.

2. The camera module of claim 1, wherein
the liquid crystal panel includes a first substrate including a first electrode, a second substrate opposed to the first substrate and including a second electrode, and the liquid crystal layer interposed between the first substrate and the second substrate, and
the liquid crystal panel is in a transparent state when no electric field acts on the liquid crystal layer, and is in an absorption state when an electric field acts on the liquid crystal layer.

3. The camera module of claim 2, wherein
the first substrate includes a first alignment film that covers the first electrode and is in contact with the liquid crystal layer,
the second substrate includes a second alignment film that covers the second electrode and is in contact with the liquid crystal layer, and
the first alignment film and the second alignment film are vertical alignment films.

4. The camera module of claim 3, wherein
the first substrate includes a first protruding portion protruding from the first electrode toward the liquid crystal layer, and
the second substrate includes a second protruding portion protruding from the second electrode toward the liquid crystal layer.

5. The camera module of claim 3, wherein
the first electrode and the second electrode both have a slit.

6. The camera module of claim 3, wherein
the first alignment film and the second alignment film are subjected to alignment treatment in a predetermined direction.

* * * * *